(12) United States Patent
Suh

(10) Patent No.: US 8,085,636 B2
(45) Date of Patent: Dec. 27, 2011

(54) RECORDING MEDIUM, METHOD FOR RECORDING CONTROL INFORMATION IN THE RECORDING MEDIUM, AND METHOD AND APPARATUS FOR RECORDING/REPRODUCING DATA IN/FROM THE RECORDING MEDIUM USING THE SAME

(75) Inventor: Sang Woon Suh, Seoul (KR)

(73) Assignee: LG Electronics Inc., Seoul (KR)

( * ) Notice: Subject to any disclaimer, the term of this patent is extended or adjusted under 35 U.S.C. 154(b) by 738 days.

(21) Appl. No.: 11/189,767

(22) Filed: Jul. 27, 2005

(65) Prior Publication Data

US 2006/0023622 A1 Feb. 2, 2006

(30) Foreign Application Priority Data

Jul. 27, 2004 (KR) .................. 10-2004-0058645

(51) Int. Cl.
*G11B 7/24* (2006.01)
*G11B 15/14* (2006.01)
*G11B 19/04* (2006.01)
*G11B 5/58* (2006.01)

(52) U.S. Cl. .................. 369/53.22; 369/275.3
(58) Field of Classification Search .................. 369/275
See application file for complete search history.

(56) References Cited

U.S. PATENT DOCUMENTS

| 5,361,173 A | 11/1994 | Ishii et al. |
| 5,485,469 A | 1/1996 | Suzuki |
| 5,541,900 A | 7/1996 | Ito et al. |
| 5,590,096 A | 12/1996 | Ohtsuka et al. |
| 5,636,631 A | 6/1997 | Waitz et al. |
| 5,712,838 A | 1/1998 | Inazawa et al. |
| 5,764,621 A | 6/1998 | Choi |
| 5,793,546 A | 8/1998 | Tanaka |
| 5,835,462 A | 11/1998 | Mimnagh |
| 5,892,633 A | 4/1999 | Ayres et al. |
| 5,959,962 A | 9/1999 | Matsumaru et al. |
| 6,005,837 A | 12/1999 | Bruekers |
| 6,415,435 B1 | 7/2002 | McIntyre |
| 6,480,450 B1 | 11/2002 | Fujii et al. |
| 6,487,713 B1 | 11/2002 | Cohen et al. |
| 6,504,806 B1 | 1/2003 | Nakajo |
| 6,532,201 B1 | 3/2003 | Hogan |
| 6,535,470 B1 | 3/2003 | Wu |
| 6,580,671 B1 | 6/2003 | Otomo et al. |
| 6,643,233 B1 | 11/2003 | Yen et al. |

(Continued)

FOREIGN PATENT DOCUMENTS

CN 1151071 A 6/1997

(Continued)

*Primary Examiner* — Wayne Young
*Assistant Examiner* — Carl Adams
(74) *Attorney, Agent, or Firm* — Birch, Stewart, Kolasch & Birch, LLP

(57) ABSTRACT

A recording medium, a method for recording control information in the recording medium, and a method and apparatus for recording/reproducing data in/from the recording medium using the same are disclosed. The recording medium includes a data area, and a management area for recording control information capable of identifying write compatibility and read compatibility with a driver for recording or reading data on or from the recording medium. Herein, the control information may include a class number for identifying the read compatibility, and a version number for identifying the write compatibility, and the write compatibility may be determined using the version number within the class number.

31 Claims, 10 Drawing Sheets

U.S. PATENT DOCUMENTS

| | | |
|---|---|---|
| 6,684,328 B2 | 1/2004 | Matsuura |
| 6,868,054 B1 * | 3/2005 | Ko ............................. 369/59.25 |
| 6,894,961 B1 | 5/2005 | Osakabe |
| 6,996,047 B2 | 2/2006 | Nagano |
| 6,999,393 B2 | 2/2006 | Yamada |
| 7,012,878 B2 | 3/2006 | Shinotsuka et al. |
| 7,046,605 B1 | 5/2006 | Ko |
| 7,075,871 B2 | 7/2006 | Kato et al. |
| 7,088,667 B2 | 8/2006 | Kobayashi et al. |
| 7,151,729 B1 | 12/2006 | Park et al. |
| 7,161,881 B2 | 1/2007 | Pereira |
| 7,170,841 B2 | 1/2007 | Shoji et al. |
| 7,193,948 B2 | 3/2007 | Furukawa et al. |
| 7,212,480 B2 | 5/2007 | Shoji et al. |
| 7,218,585 B2 | 5/2007 | Tanii et al. |
| 7,230,907 B2 | 6/2007 | Shoji et al. |
| 7,286,455 B2 | 10/2007 | Shoji et al. |
| 7,369,475 B2 | 5/2008 | Nagai |
| 7,376,072 B2 | 5/2008 | Shoji et al. |
| 7,400,571 B2 | 7/2008 | Shoji et al. |
| 7,423,951 B2 | 9/2008 | Shoji et al. |
| 7,471,879 B2 | 12/2008 | Fuchigami et al. |
| 7,650,362 B2 | 1/2010 | Suh |
| 7,706,230 B2 | 4/2010 | Kim |
| 2001/0044935 A1 | 11/2001 | Kitayama |
| 2001/0053115 A1 | 12/2001 | Nobukuni et al. |
| 2002/0021656 A1 | 2/2002 | Tsukagoshi et al. |
| 2002/0044509 A1 * | 4/2002 | Nakajima ................... 369/53.22 |
| 2002/0048241 A1 | 4/2002 | Kumagai et al. |
| 2002/0048646 A1 | 4/2002 | Tomura et al. |
| 2002/0085470 A1 | 7/2002 | Yokoi |
| 2002/0089919 A1 | 7/2002 | Ko et al. |
| 2002/0126604 A1 | 9/2002 | Powelson et al. |
| 2002/0126611 A1 | 9/2002 | Chang |
| 2002/0150014 A1 | 10/2002 | Nijboer et al. |
| 2002/0167880 A1 | 11/2002 | Ando et al. |
| 2002/0172499 A1 | 11/2002 | Tozaki et al. |
| 2003/0021201 A1 | 1/2003 | Kobayashi |
| 2003/0021202 A1 | 1/2003 | Usui et al. |
| 2003/0058771 A1 | 3/2003 | Furukawa et al. |
| 2003/0067859 A1 | 4/2003 | Weijenbergh et al. |
| 2003/0067862 A1 * | 4/2003 | Rilum et al. ............... 369/275.4 |
| 2003/0086345 A1 | 5/2003 | Ueki |
| 2003/0137915 A1 | 7/2003 | Shoji et al. |
| 2003/0151994 A1 | 8/2003 | Tasaka et al. |
| 2003/0159135 A1 | 8/2003 | Hiller et al. |
| 2003/0223339 A1 | 12/2003 | Taniguchi et al. |
| 2003/0231567 A1 | 12/2003 | Moritomo |
| 2004/0001407 A1 | 1/2004 | Kim et al. |
| 2004/0004921 A1 | 1/2004 | Lee et al. |
| 2004/0010745 A1 | 1/2004 | Lee et al. |
| 2004/0022150 A1 | 2/2004 | Lee et al. |
| 2004/0030962 A1 * | 2/2004 | Swaine et al. ................... 714/45 |
| 2004/0076097 A1 | 4/2004 | Sawabe et al. |
| 2004/0184395 A1 * | 9/2004 | Lee et al. .................... 369/275.3 |
| 2004/0184396 A1 | 9/2004 | Lee et al. |
| 2005/0019023 A1 | 1/2005 | Ko |
| 2005/0036425 A1 | 2/2005 | Suh et al. |
| 2005/0038957 A1 | 2/2005 | Suh |
| 2005/0105429 A1 | 5/2005 | Nagai |
| 2005/0254413 A1 | 11/2005 | Kim |
| 2006/0155987 A1 | 7/2006 | Winter |
| 2006/0198261 A1 | 9/2006 | Lee |
| 2006/0227681 A1 | 10/2006 | Lee et al. |
| 2006/0233059 A1 | 10/2006 | Suh et al. |
| 2007/0088954 A1 * | 4/2007 | Furukawa et al. ............ 713/176 |
| 2007/0115765 A1 * | 5/2007 | Kobayashi ................. 369/44.13 |
| 2007/0156953 A1 | 7/2007 | Suh |
| 2008/0043588 A1 | 2/2008 | Suh et al. |
| 2009/0129494 A1 | 5/2009 | Lee et al. |

FOREIGN PATENT DOCUMENTS

| | | |
|---|---|---|
| CN | 1229503 A | 9/1999 |
| CN | 1656544 A | 8/2005 |
| EP | 0265984 A1 | 5/1988 |
| EP | 0506680 B1 | 10/1992 |
| EP | 0552903 A2 | 7/1993 |
| EP | 0571926 A1 | 12/1993 |
| EP | 0821817 B1 | 2/1998 |
| EP | 0968769 A2 | 1/2000 |
| EP | 1172810 A2 | 1/2002 |
| EP | 1244097 A2 | 9/2002 |
| EP | 1 293 981 A1 | 3/2003 |
| EP | 1308942 A2 | 5/2003 |
| EP | 1329888 A1 | 7/2003 |
| EP | 1331631 A1 | 7/2003 |
| EP | 1361571 A1 | 11/2003 |
| EP | 1369850 A1 | 12/2003 |
| EP | 1471506 A1 | 10/2004 |
| EP | 1522994 A | 4/2005 |
| EP | 1605445 A2 | 12/2005 |
| JP | 6-150333 A | 5/1994 |
| JP | 9-147487 A | 6/1997 |
| JP | 9-160761 A | 6/1997 |
| JP | 11-25607 A | 1/1999 |
| JP | 1 1-85413 A | 3/1999 |
| JP | 11-66607 A | 3/1999 |
| JP | 11-86451 A | 3/1999 |
| JP | 2000-113458 A | 4/2000 |
| JP | 2001-297447 A | 10/2001 |
| JP | 2001-312861 A | 11/2001 |
| JP | 2002-50040 A | 2/2002 |
| JP | 2002-50053 A | 2/2002 |
| JP | 2002-74855 A | 3/2002 |
| JP | 2002-124038 A | 4/2002 |
| JP | 2002-245625 A | 8/2002 |
| JP | 2003-59062 A | 2/2003 |
| JP | 2003-203341 A | 7/2003 |
| JP | 2003-257026 A | 9/2003 |
| JP | 2004-005772 A | 1/2004 |
| JP | 2005-503623 A | 2/2005 |
| JP | 2005-149655 A | 6/2005 |
| JP | 2005-310358 A | 11/2005 |
| JP | 2005-535061 A | 11/2005 |
| JP | 2006-31907 A | 2/2006 |
| JP | 2006-517711 A | 7/2006 |
| JP | 2006-520990 A | 9/2006 |
| JP | 2006-520991 A | 9/2006 |
| KR | 1997-0003101 A | 1/1997 |
| KR | 1998-0011382 A | 4/1998 |
| RU | 2225043 C1 | 2/2004 |
| TW | 430785 | 4/2001 |
| TW | 460861 | 10/2001 |
| TW | 541522 | 7/2003 |
| TW | 200301465 | 7/2003 |
| WO | WO 91/06068 A1 | 5/1991 |
| WO | WO-97/13244 A1 | 4/1997 |
| WO | WO-00/79525 A1 | 12/2000 |
| WO | WO-02/29791 A1 | 4/2002 |
| WO | WO-02/065462 A1 | 8/2002 |
| WO | WO-02/089123 A1 | 11/2002 |
| WO | WO-03/010519 A1 | 2/2003 |
| WO | WO-03/025935 A1 | 3/2003 |
| WO | WO-03/067581 A1 | 8/2003 |
| WO | WO-03/075265 A2 | 9/2003 |
| WO | WO 03/100775 A1 | 12/2003 |
| WO | WO 03/102930 A1 | 12/2003 |
| WO | WO-03/105139 A1 | 12/2003 |
| WO | WO-2004/013845 A1 | 2/2004 |
| WO | WO-2004/072966 A1 | 8/2004 |
| WO | WO-2004/084201 A1 | 9/2004 |
| WO | WO-2005/001819 A1 | 1/2005 |
| WO | WO 2005/017885 A1 | 2/2005 |

* cited by examiner

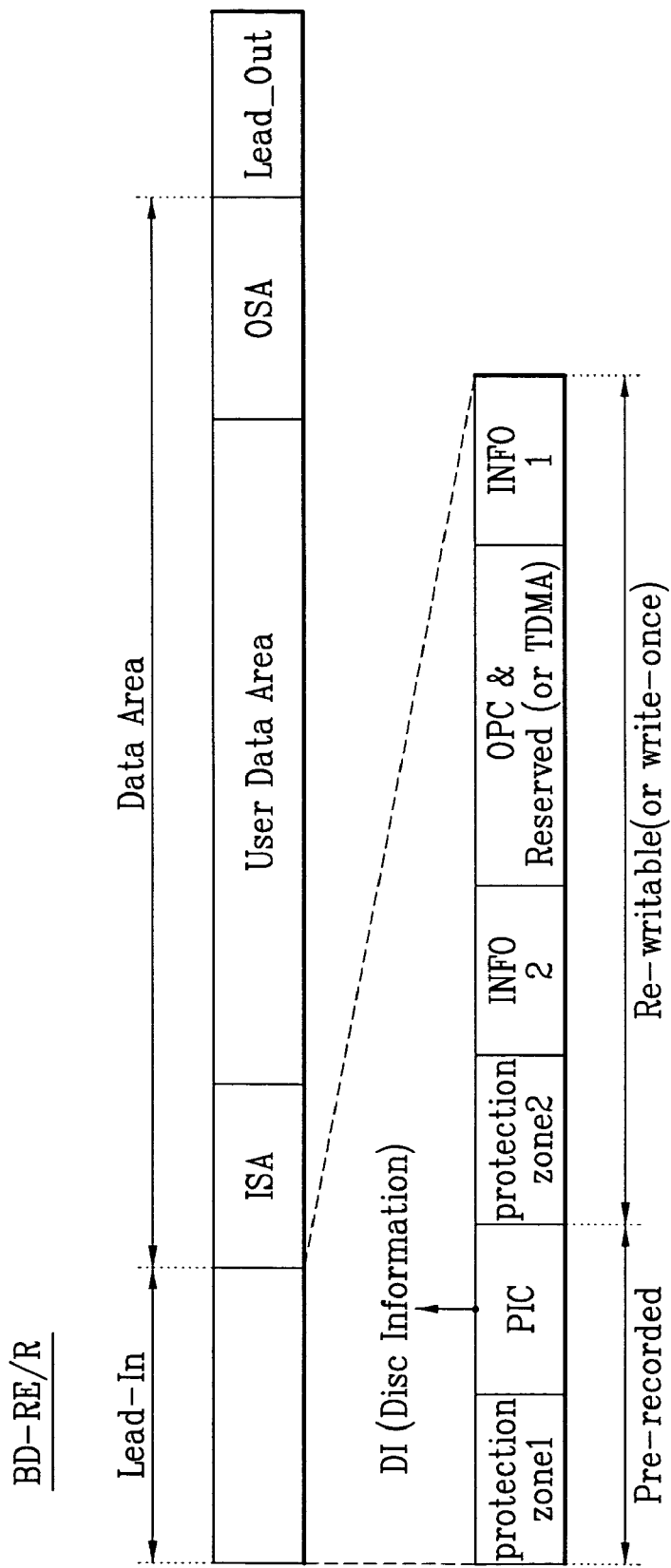

FIG. 6A

| Type info. (3bytes) | Class info. (2bits) | Version info. (4bits) |
|---|---|---|
| BDW or BDR or BDO | 00b (class 0) | 0000b: version 0<br>0001b: version 1<br>0010b: version 2<br>0011b: version 3 |
| | 01b (class 1) | 0000b: version 0<br>0001b: version 1<br>0010b: version 2<br>0011b: version 3 |
| | 10b (class 2) | 0000b: version 0<br>0001b: version 1<br>0010b: version 2 |
| | 11b (class 3) | 0000b: version 0<br>0001b: version 1<br>0010b: version 2<br>0011b: version 3 |

Version number start version 0 in each class

FIG. 6B

| Type info. (3bytes) | Class info. (2bits) | Version info. (4bits) |
|---|---|---|
| BDW or BDR or BDO | 00b (class 0) | 0000b: version 0<br>0001b: version 1<br>0010b: version 2<br>0011b: version 3 |
| | 01b (class 1) | 0100b: version 4<br>0101b: version 5<br>0110b: version 6 |
| | 10b (class 2) | 0111b: version 7<br>1000b: version 8<br>1001b: version 9 |
| | 11b (class 3) | 1010b: version 10<br>1011b: version 11<br>1100b: version 12 |

At class changing, Version number update.

FIG. 6C

| Type info. (3bytes) | Class info. (2bits) | Version info. (4bits) |
|---|---|---|
| BDW or BDR or BDO | 00b (class 0) | 0000b: version 0<br>0001b: version 1<br>0010b: version 2<br>0011b: version 3 |
| | 01b (class 1) | 0011b: version 3<br>0100b: version 4<br>0101b: version 5 |
| | 10b (class 2) | 0101b: version 5<br>0110b: version 6<br>0111b: version 7 |
| | 11b (class 3) | 0111b: version 7<br>1000b: version 8<br>1001b: version 9 |

In class 0, Version number start version 0

In class 1, 2, and 3, Version number start last version number of previous class

RECORDING MEDIUM, METHOD FOR RECORDING CONTROL INFORMATION IN THE RECORDING MEDIUM, AND METHOD AND APPARATUS FOR RECORDING/REPRODUCING DATA IN/FROM THE RECORDING MEDIUM USING THE SAME

This application claims the benefit of Korean Patent Application No. 10-2004-0058645, filed on Jul. 27, 2004, which is hereby incorporated by reference as if fully set forth herein.

BACKGROUND OF THE INVENTION

1. Field of the Invention

The present invention relates to a recording medium, and a method and apparatus for reproducing data recorded in the recording medium, and more particularly, to a method for recording control information capable of controlling read/write compatibility of a recording medium in the recording medium, and a method and apparatus for recording/reproducing data in/from the recording medium using the control information.

2. Discussion of the Related Art

Generally, there has been widely used an optical disc acting as a recording medium capable of recording a large amount of data therein. Particularly, there has been newly developed a high-density optical recording medium (e.g., a HD-DVD) capable of recording/storing high-quality video data and high-quality audio data for a long period of time, for example, a Blu-ray Disc (BD).

The BD based on the next-generation HD-DVD technique has been considered to be the next-generation optical recording solution capable of storing much more data than a conventional DVD. In recent times, the international standard technical specification associated with the BD has been established.

A variety of standard technical specifications associated with the BD have been established. And, A variety of standard technical specifications associated with various discs, for example, a 1x-speed BD-RE (Blu-ray Disc Rewritable), a high-speed (at least 2x-speed) BD-RE, a write-once BD-R, and a BD-ROM (Read Only Memory), have also been established.

Therefore, with the increasing development of BD-associated technologies, many developers have continuously updated standardized version information of BD based on the same system to new standardized version information thereof. For example, BD specification information has been continuously extended from the 1x-speed BD-RE to the high-speed (at least 2x-speed) BD-RE.

However, due to the extended version of the BD, if a recording/reproducing device suitable for a low-version disc records/reproduces data in/from a high-version disc, it may be impossible to record/reproduce data in/from the high-version disc, or it may incur an unexpected error in the recording/reproducing operations of the high-version disc. The low-version recording/reproducing device is unable to correctly recognize the presence or absence of the error, such that it reattempts to record and/or reproduce data in the high-version disc, resulting in fatal errors in an overall system.

SUMMARY OF THE INVENTION

Accordingly, the present invention is directed to a recording medium, a method for recording control information in the recording medium, and a method and apparatus for recording/reproducing data in/from the recording medium using the same that substantially obviate one or more problems due to limitations and disadvantages of the related art.

An object of the present invention is to provide a method for recording control information acting as standardized information, capable of controlling read/write compatibility of a recording medium, in the recording medium.

Another object of the present invention is to provide a recording/reproducing method and apparatus using the control information stored in the recording medium when recording/reproducing data of the recording medium.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a recording medium includes a data area, and a management area for recording control information capable of identifying write compatibility and read compatibility with a driver for recording or reading data on or from the recording medium, wherein the control information includes a class number for identifying the read compatibility, and a version number for identifying the write compatibility, and the write compatibility is determined using the version number within the class number.

In another aspect of the present invention, a method for recording control information in a recording medium includes the step of recording the control information including a version number and a class number in a specific area of the recording medium, wherein the class number specifies a read compatibility and is sequentially increased whenever attribute information of the recording medium is changed to a predetermined range having no read compatibility, and the version number specifies a write compatibility and is sequentially increased whenever attribute information of the recording medium is changed to a predetermined range having no write compatibility, and the write compatibility is determined using the version number within class number.

In another aspect of the present invention, a method for recording or reproducing data on or from a recording medium includes the steps of a) reading a class number and a version number from a specific area of recording medium loaded in a driver, wherein the class number for identifying a read compatibility, and the version number for identifying a write compatibility, and, the write compatibility is determined using the version number within the class number, b) determining whether the recording medium keeps the write compatibility and/or read compatibility with the driver on the basis of the read class and version numbers, and c) controlling an access operation to record and/or reproduce data on or from the recording medium as a result of step b).

In a further aspect of the present invention, an apparatus for recording/reproducing data on/from a recording medium includes a pickup unit recording and/or reading data on or from the recording medium, and a controller controlling the pickup unit to read a class number and a version number recorded in a specific area of the recording medium, the version number having a specific value within the class number, determining whether the recording medium keeps the write compatibility and/or read compatibility with the driver on the basis of the read class and version numbers, and controlling an access operation to record and/or reproduce data on or from the recording medium as a result of the determination.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2a is a structural diagram illustrating a recordable recording medium having a single-layer structure according to the present invention;

FIGS. 6a~6c are methods for updating control information according to the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

A recording medium for use in the present invention is indicative of all recordable mediums, for example, an optical disc, and a magnetic tape, etc. For the convenience of description and better understanding of the present invention, the optical disc, such as a BD, will hereinafter be exemplarily used as the above-mentioned recording medium in the present invention. It should be noted that technical ideas of the present invention can be applied to other recording mediums without departing from the scope and spirit of the invention.

The term "Control Information" is indicative of a variety of information used for recording/reproducing operations of a recording medium. Generally, the control information is pre-recorded in a predetermined management area of the recording medium using embossed pits by a manufacturer or author of the recording medium, or is contained in a wobble shape of a recording track.

For example, the control information is called disc information, and is generally called physical format information in specific discs, for example, a DVD-RAM, a DVD-RW, a DVD+RW, a DVD-R, and a DVD+R. For the convenience of description, the control information will hereinafter be referred to as a DI (Disc Information) corresponding to a BD. A detailed structure of the DI and a method for recording the DI will hereinafter be described with reference to FIGS. 2 to 7.

Figure 1:
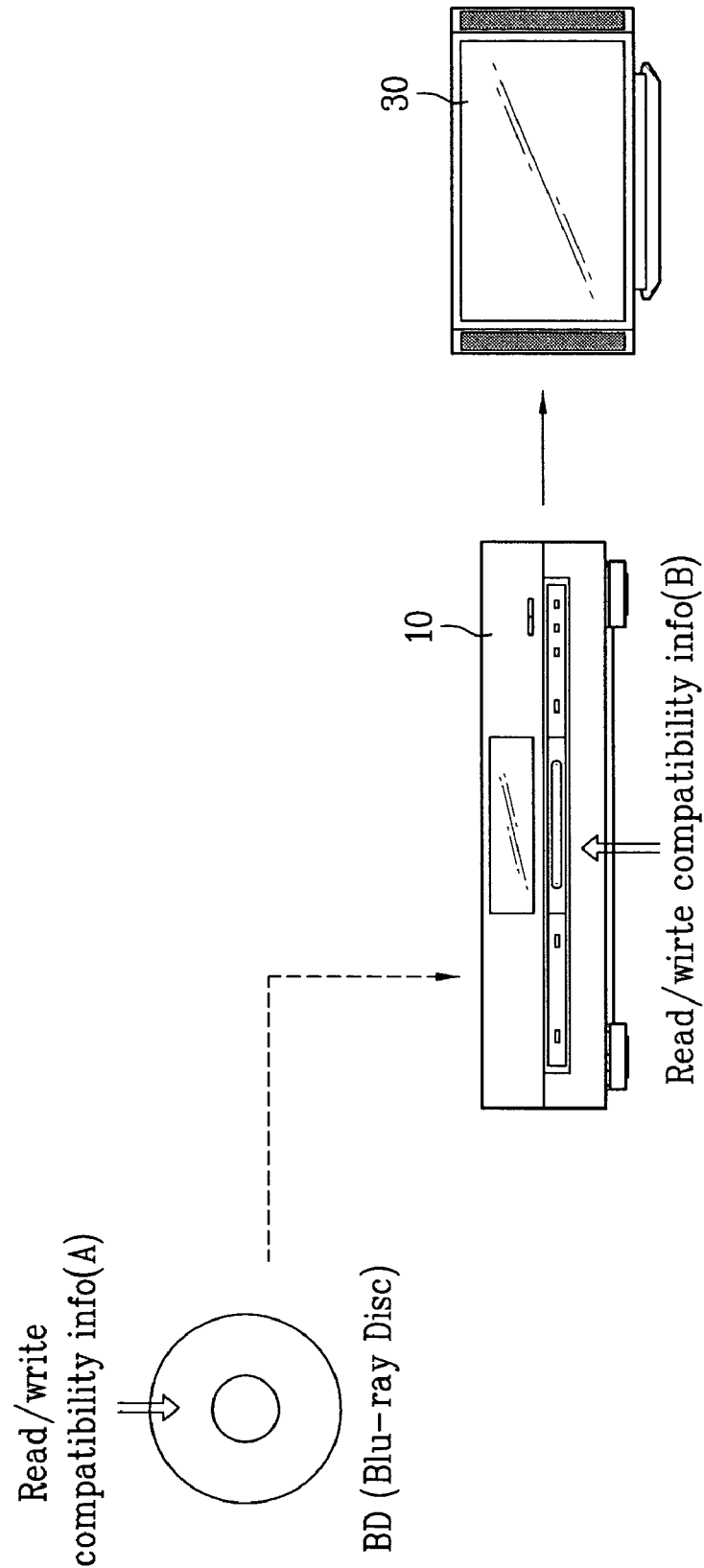
FIG. 1 is a conceptual diagram illustrating a technical idea of the present invention.

FIG. 1 is a conceptual diagram illustrating a technical idea of the present invention.

Referring to FIG. 1, if an optical disc 40 is seated in a recording/reproducing unit 10, a recording or reproducing operation is performed by a user request, such that data is recorded in the optical disc or is reproduced from the optical disc, and the resultant data is applied to a user via a final display 30.

In this case, the recording/reproducing unit 10 cannot record or reproduce data of all discs 40 seated in the recording/reproducing unit 10. In other words, provided that the recording/reproducing unit 10 is manufactured in a specific mode capable of supporting a low-version specification, and the disc 40 is manufactured to be suitable for high-version functions, a low-version recording/reproducing unit may not record or reproduce data of a high-version disc.

However, if the recording/reproducing unit cannot recognize the above-mentioned situation, it continuously attempts to record/reproduce data of the loaded disc, resulting in the occurrence of unexpected errors.

Therefore, the present invention allows the disc to include first read/write compatibility information A, and allows the recording/reproducing unit to include second read/write compatibility information B. In addition, the present invention can determine whether a recording or reproducing operation is available on the basis of the above-mentioned information A and B, such that the recording/reproducing operations can be stably performed.

A method for recording a variety of information acting as control information, capable of identifying the read/write compatibility in a recording medium will hereinafter be described with reference to FIGS. 2a~6c. A method for performing recording/reproducing operations of the recording medium using the above-mentioned control information will hereinafter be described with reference to FIG. 7.

Figure 2B:
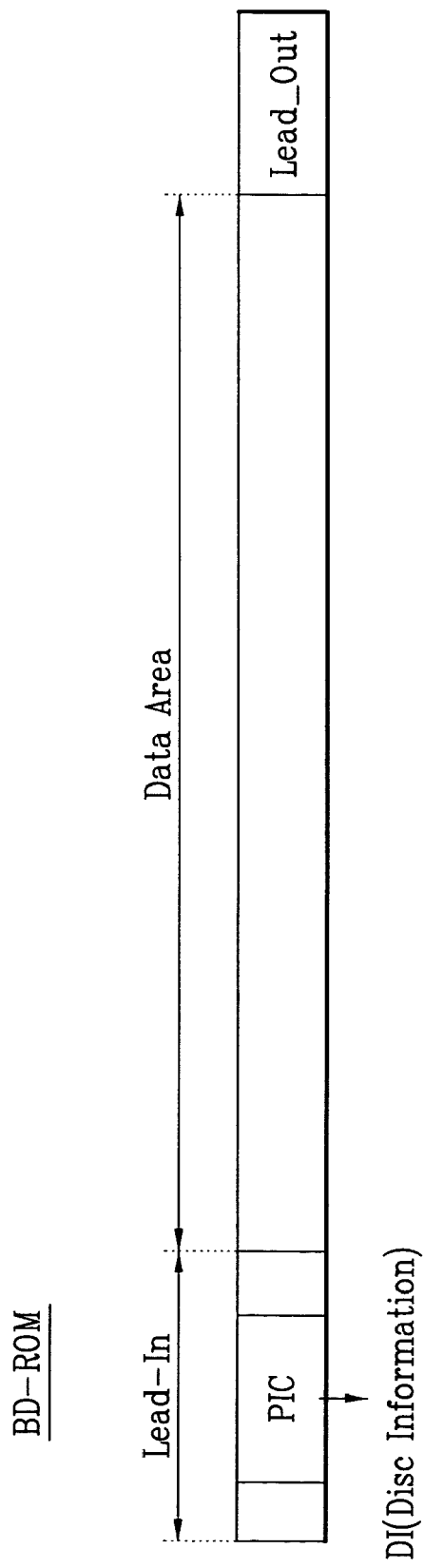
FIG. 2b is a structural diagram illustrating a read-only recording medium having a single-layer structure according to the present invention.

FIGS. 2a~2b are structural diagrams illustrating a single-layer BD having a single record layer. In more detail, FIG. 2a is a structural diagram illustrating a BD-RE/R, and FIG. 2b is a structural diagram illustrating a BD-ROM.

Referring to FIG. 2b, the BD-RE/R according to the present invention includes a Lead-In area acting as a management area in an inner area of an optical disc, and also includes a Lead-out area acting as the management area in an outer area of the optical disc. Particularly, the inner area of the disc includes a pre-recorded area and a rewritable or write-once area.

The pre-recorded area is recorded when the disc is manufactured, such that a user or system cannot add other data to the pre-recorded area in the future. Particularly, the pre-recorded data for use in the BD is generally called a PIC (Permanent Information & Control data), and the DI recorded in the PIC can be read. However, it should be noted that the above-mentioned case is exemplarily shown in the present invention, and an area including the control information of the present invention is not limited to the above-mentioned example, and is applicable to other examples as necessary.

A data area includes a user data area for recording actual user data and a plurality of spare areas ISA and OSA substituting for defective areas. A write-once optical disc such as a BD-R includes a TDMA (Temporary Disc Management Area) for recording disc fault management information and general management information in a management area. The TDMA is no longer required in the BD-RE, such that it remains as a reserved area.

FIG. 2b is a structural diagram illustrating a BD-ROM. All areas of the BD-ROM are indicative of pre-recorded areas, and the DI associated with the present invention can be recorded in a PIC area contained in the Lead-in area in the BD-ROM.

Figure 3:
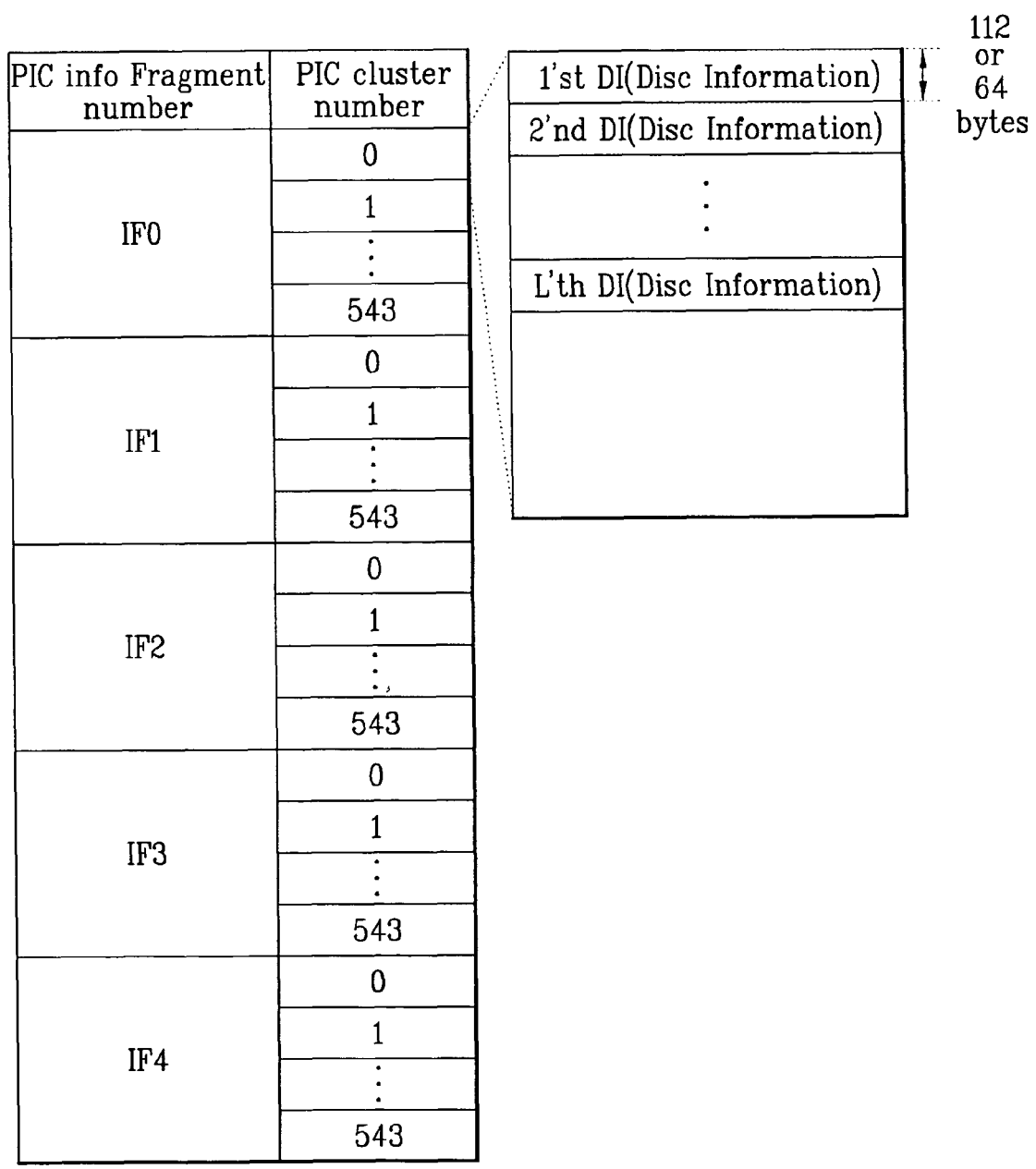
FIG. 3 shows some parts of a management area including control information according to the present invention.

FIG. 3 is a structural diagram illustrating the PIC area contained in the above-mentioned disc structures shown in FIGS. 2a~2b. For example, a minimum record unit of the BD is denoted by a 1 cluster. The PIC area is composed of 544 clusters, such that it forms a fragment as a single upper record unit. Five fragments are collected to form the PIC area.

In more detail, a head cluster of a first fragment IF0 firstly records the DI therein. In this case, a plurality of DI are recorded in the head cluster while being classified according to allowable recording layers and allowable data read speeds of a corresponding optical disc. For example, the number of DI is exemplarily denoted by "L" in FIG. 3. The single DI can be composed of 112 bytes or 64 bytes. The DI composed of 112 bytes or 64 bytes is also called a DI (Disc Information) frame. The remaining clusters of the first fragment IF0 repeatedly record the DI in the same manner as in the head cluster. Also, the remaining fragments IF1~IF4 repeatedly record the same DI as that of the first fragment IF0. Since the DI is repeatedly recorded as described above, the present invention can properly cope with damage or fault of the DI.

In association with the above-mentioned description, the BD-RE/R must include record speed information and record-associated information (WS) in the DI frame, such that it is preferable that the size of the DI frame correspond to 112 bytes.

However, the BD-ROM need not include the record speed information and the record-associated information (WS) in its DI frame, such that it is preferable that the size of the DI frame correspond to 64 bytes. In this case, the above-mentioned byte information indicative of the DI frame is exemplarily shown in the present invention, and can also be modified in various ways according to the magnitude of information contained in the DI.

A method for recording read/write compatibility information acting as one of the above-mentioned DI information in a recording medium, and a method for updating the above-mentioned information will hereinafter be described with reference to FIGS. 4~6c.

In association with the above-mentioned description, the read/write compatibility information includes type information, class information, and version information.

Firstly, the type information is adapted to identify category information of a disc. For example, a user or a recording/reproducing unit can determine whether a current disc is a BD-RE, a write-once BD-R, or a BD-ROM using the type information.

The class information is adapted to identify an allowable range of reproduction compatibility (also called read compatibility) in individual disc types, and is denoted by a class number. The allowable range of reproduction compatibility is determined to be a predetermined range in which physical attributes of the disc are not changed.

Therefore, if basic physical attributes of the disc are changed, the class number also increases. For example, the class number begins at a specific number of "0", and increases by one whenever the basic physical attributes are changed.

For example, provided that the recording/reproducing unit supports a specific class number of "0", and a high-class disc having a specific class number of more than "1" is seated in the recording/reproducing unit, the recording/reproducing unit cannot access a data area of a corresponding disc.

On the contrary, provided that the recording/reproducing unit supports the class number of "2", and a low-class disc having at least the class number of "1" is seated in the recording/reproducing unit, the recording/reproducing unit can record/reproduce data of the corresponding disc. However, if the same-class disc having a class number of "2" is seated in the recording/reproducing unit, the recording/reproducing unit can reproduce data of the disc, but its record-associated information indicative of a recordable or unrecordable state of data is determined by a version number to be described later. In other words, although the read compatibility is maintained in the same-class number, a recordable or unrecordable state of the data must be determined by the version number.

The version information is used as information capable of identifying the presence or absence of write compatibility, and is denoted by a version number. The allowable range of the write compatibility indicates a specific case in which attribute information associated with the record operation is not changed in a predetermined read-compatibility range. For example, the increase of the record speed, and the addition of a specific area to a corresponding disc can be considered to be the change of record-associated attribute information.

Therefore, if the record-associated attribute information is changed, the version number also increases. For example, the version number begins at a specific number of "0", and increases by one whenever the attribute information is changed. In association with this operation, the increase or decrease of the class number and the version number is determined according to the degree of extension of a conventional specification when the conventional specification is extended.

Generally, provided that the recording/reproducing unit includes a specific class number and a version number, and a disc having a high-version number and the same class number is seated in the recording/reproducing unit, it cannot record data in the disc whereas it can reproduce data of the disc. However, it is undesirable that a recording/reproducing unit having a low-version number cannot record data in the disc having a high-version number at all times. Therefore, if it is determined that the recording/reproducing unit having the low-version number can perform a record operation with reference to both record speed information and record-associated information (WS) recorded as a DI in the high-version disc, it is preferable that the data recording in the high-version disc having the high-version number be allowed. This operation is called bridge-write compatibility.

In other words, although the high-version recording/reproducing unit having the high-version number can freely record data in the high-version disc, a low-version recording/reproducing unit having a low-version number must finally determine the recordable or unrecordable state by referring to all DI recorded in the high-version disc, such that the low-version recording/reproducing unit can record data in the high-version disc.

Figure 4:
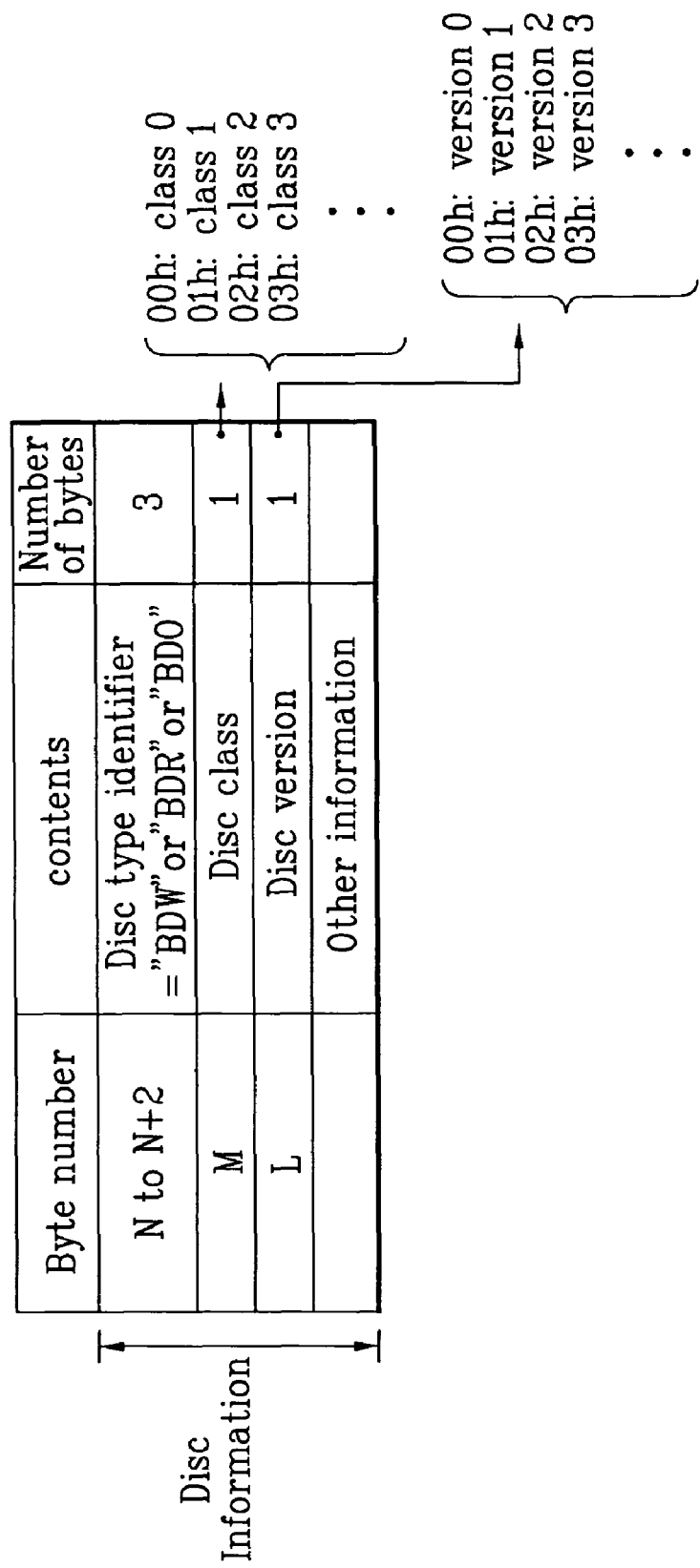
FIG. 4 shows a method for recording control information in a recording medium in accordance with a first preferred embodiment of the present invention.

FIG. 4 shows a method for recording the type information, the class information, and the version information in the DI according to the present invention.

Referring to FIG. 4, a "Disc Type Identifier" field is included in (N~N+2)-th bytes of the DI, such that type information of a corresponding disc is recorded in the "Disc Type Identifier" field. For example, a writable disc can be denoted by "BDW", a write-once disc can be denoted by "BDR", and a read-only disc can be denoted by "BDO".

A "Disc Class" field is included in an M-th byte of the DI, such that it records a class number of a corresponding disc. For example, if the value of 1 byte is "00h", a class number is set to "0" as denoted by "Class 0". If the value of 1 byte is "01h", a class number is set to "1" as denoted by "Class 1". If the value of 1 byte is "02h", a class number is set to "2" as denoted by "Class 2".

A "Disc Version" field is included in an L-th byte of the DI, such that it records a version number of a corresponding disc. For example, if the value of 1 byte is "00h", a version number is set to "0" as denoted by "Version 0". If the value of 1 byte is "01h", a version number is set to "1" as denoted by "Version 1". If the value of 1 byte is "02h", a class number is set to "2" as denoted by "Version 2".

The DI includes a variety of control information along with the type information, the class information, and the version information. Particularly, it should be understood that the writable disc stores the record speed information and the record-associated information (WS), etc.

In association with the above-mentioned operation, the preferred embodiment shown in FIG. 4 exemplarily shows type information, class information, and version information, and it should be noted that it can be modified in various ways as necessary.

Figure 5:
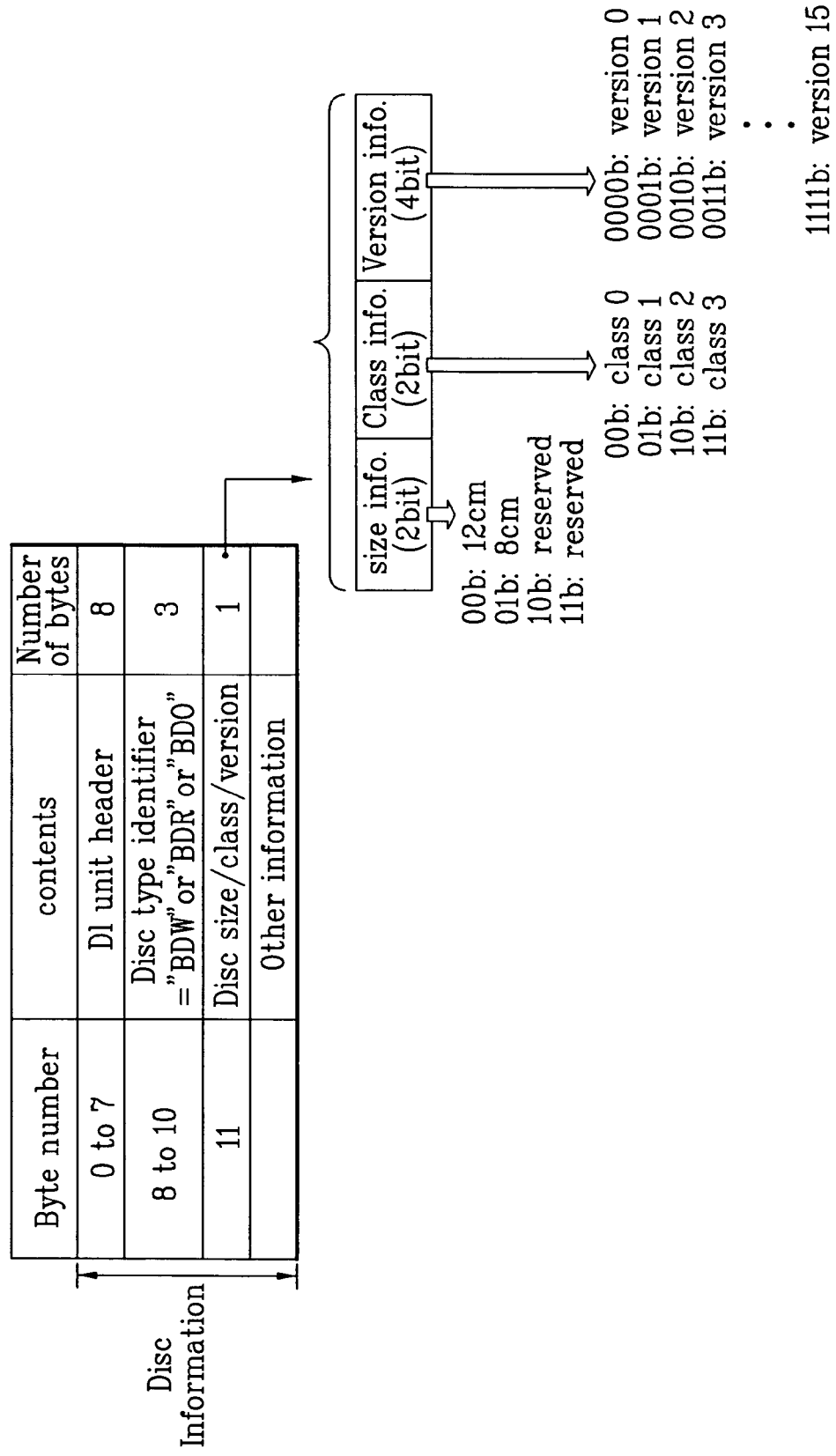
FIG. 5 shows a method for recording control information in a recording medium in accordance with a second preferred embodiment of the present invention.

FIG. 5 shows another method for recording the type information, the class information, and the version information in the DI in accordance with a second preferred embodiment of the present invention. Particularly, FIG. 5 shows an exemplary record method compatible with a currently-discussed DI structure.

Referring to FIG. 5, a "DI unit header" field is included in 8 head bytes (i.e., 0-th~7-th bytes) contained in a DI, such that header information of the DI is recorded in the "DI unit header" field. For example, the header information includes a variety of information, for example, "Disc Information Identifier" data, "DI format" data, and "DI unit sequence number in DI block" data, etc.

A "Disc Type Identifier" field is included in the following three bytes (i.e., 8-th~10-th bytes of the above-mentioned head bytes, such that type information of a corresponding disc is recorded in the "Disc Type Identifier" field. For example, a writable disc can be denoted by "BDW", a write-once disc can be denoted by "BDR", and a read-only disc can be denoted by "BDO".

An 11-th byte of the DI includes a "Disc size/class/version" field, such that size-, class-, and version information of a corresponding disc are recorded in the 11-th bytes of the DI.

For example, when DI is recorded in two head bits of an 11-th byte, the two head bits of "00b" indicates a disc having a diameter of 12 cm, the two head bits of "01b" indicates a disc having a diameter of 8 cm.

The following two bits of the 11-th byte record a disc class number. If the disc class number is denoted by "00b", a class number is "0" as denoted by "Class 0". If the disc class number is denoted by "01b", a class number is "1" as denoted by "Class 1". If the disc class number is denoted by "10b", a class number is "2" as denoted by "Class 2". If the disc class number is denoted by "11b", a class number is "3" as denoted by "Class 3".

The final four bits of the 11-th byte record a disc version number. If the disc version number is denoted by "0000b", a class number is "0" as denoted by "Version 0". If the disc version number is denoted by "0001b", a class number is "1" as denoted by "Version 1". If the disc version number is denoted by "0010b", a class number is "2" as denoted by "Version 2". If the disc version number is denoted by "1111b", a class number is "15" as denoted by "Version 15".

Therefore, according to the above-mentioned preferred embodiment shown in FIG. 5, the method for recording the type information, the class information, and the version information in the DI can be performed simultaneously with maintaining compatibility associated with a currently-discussed DI structure.

FIGS. 6a~6c show methods for updating class information and version information as read/write compatibility information according to the present invention. For the convenience of description, it is assumed that the type information is composed of 3 bytes, the class information is composed of 2 bits, and the version information is composed of 4 bits according to the preferred embodiment shown in FIG. 5.

In association with the above-mentioned example, the method for updating the above-mentioned information is indicative of a method for increasing a class number and a version number according to standardized rules. In other words, a specific disc records a unique class number and a unique version number determined by the above-mentioned update method.

FIG. 6a shows a method for dependently increasing the version number in individual class numbers.

Firstly, the DI information is defined by a unique DI in individual discs, such that there is a need for only unique type information to be recorded in a corresponding disc. For example, the DI information of the present invention is classified into a writable disc denoted by "BDW", a write-once disc denoted by "BDR", and a read-only disc denoted by "BDO".

The class information is recorded as a class number as previously stated above, and is set to unique values for every disc type. In other words, if basic physical attributes are changed by the extension of a corresponding disc type specification, the class number value also increases. A low-class number does not have read compatibility in association with a high-class number. Therefore, the recording/reproducing unit having a low-class number cannot access a data area capable of reproducing data of a high-class disc having the high-class number.

The version information is recorded as a version number as previously stated above. A version number is dependent upon a specific class number, and is determined to be sequentially increased in a corresponding class number. In more detail, if a new function or new modification is added to the same class, the version number increases, a high-version number has write compatibility associated with a low-version number, but the low-version number has a limitation in implementing write compatibility associated with the high-version number. The version number of each class begins at a specific version number of "0" as denoted by "Version 0", and is sequentially increased from the version number of 0. Therefore, individual head versions of all classes are always set to a specific version of "Version 0".

FIG. 6b shows independently-increased version information.

A method for recording disc type information and a disc class number shown in FIG. 6b is equal to that of FIG. 6a, such that a method for recording a version number will hereinafter be described with reference to FIG. 6b.

Referring to FIG. 6b, the version number independently increases irrespective of a class. In more detail, the version number begins at a specific version of 0 (Version 0) indicative of a head version number of the specific class "0" (Class 0), and is sequentially increased. The version number must also be changed when the class is changed to another class, such that there is no duplication of the same version number in the same disc type.

FIG. 6c shows a modified example of FIG. 6b. In FIG. 6c, the version number is independently increased, but it should be noted that the head version number value of a current class is equal to the last version number value of a previous class.

In more detail, the version number is independently increased irrespective of a class, and is sequentially increased from the head version number of 0 (Version 0) of the class "0" (Class 0).

At a specific point at which the class number is changed to another class number, the head version number value of the current class number is equal to the last version number value of the previous class number, such that a duplicated version number in the same disc type is indicative of a class-number change point.

For example, provided the last version number of the class number "0" (Class 0) is recorded as "0011b", a head version number of the class number "1" (Class 10) is also recorded as "0011b".

Figure 7:
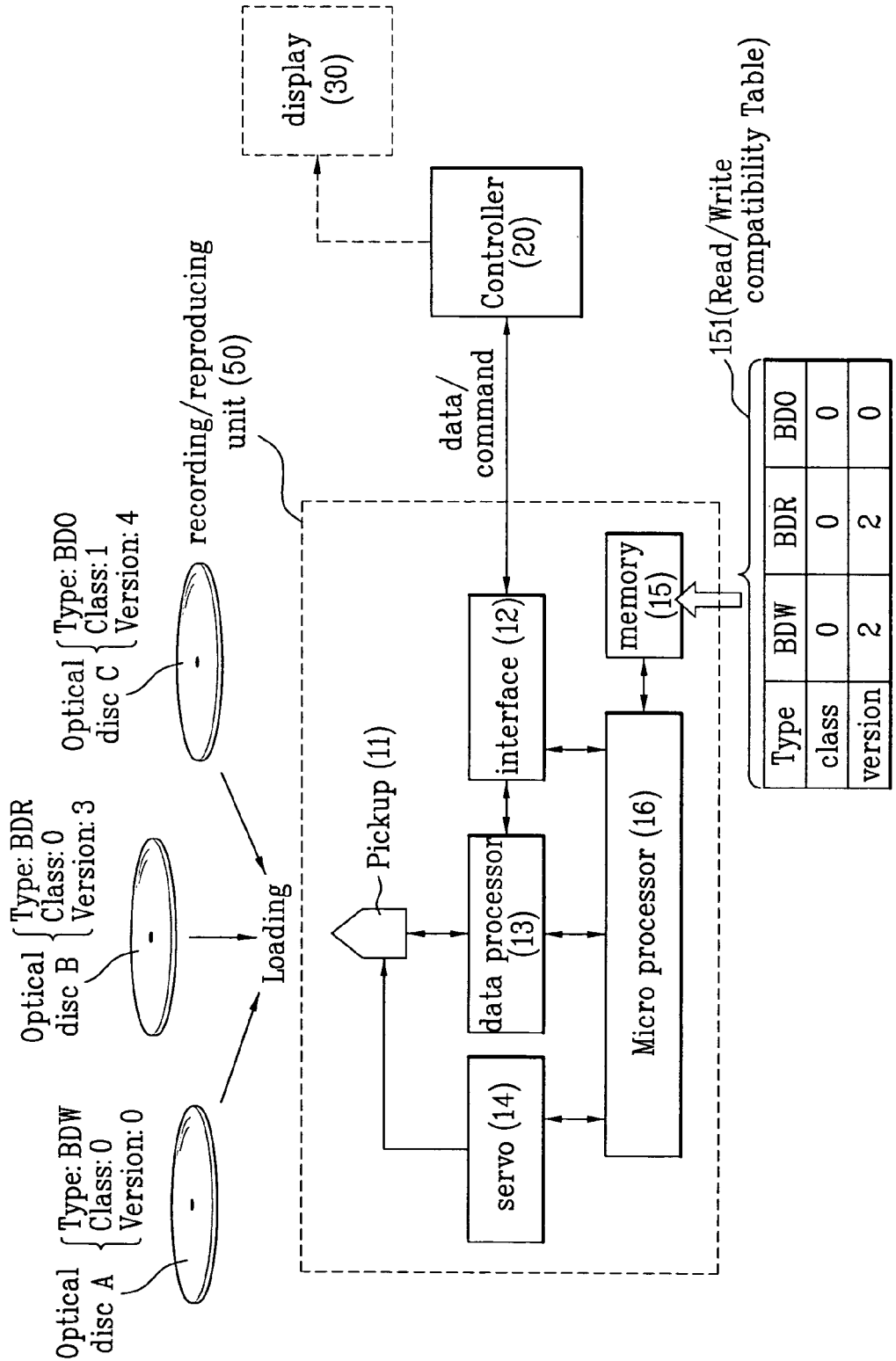
FIG. 7 is a block diagram illustrating a recording/reproducing device for a recording medium according to the present invention.

FIG. 7 is a block diagram illustrating a recording/reproducing device for an optical disc according to the present invention. The recording/reproducing device according to the present invention employs the disc type information, the class information, and the version information, such that it determines the presence or absence of read/write compatibility in association with the loaded optical disc, and finally performs recording/reproducing operations according to the determined result. A detailed description thereof will hereinafter be described with reference to FIG. 7.

Referring to FIG. 7, the recording/reproducing device includes a recording/reproducing unit 50 and a controller 20 for controlling the recording/reproducing unit 50. The controller 20 transmits a record command or a reproduction command associated with a specific area to the recording/reproducing unit 50. The recording/reproducing unit 50 performs a record or reproduction operation associated with a specific area according to a command of the controller 20. A drive connected to a computer may be composed of only the recording/reproducing unit 50.

The recording/reproducing unit 50 includes an interface unit 12, a pickup unit 11, a data processor 13, a servo unit 14, a memory 15, and a microprocessor 16.

The interface unit 12 communicates with an external part. The pickup unit 11 directly records data in an optical disc, or reproduces data of the optical disc. The data processor 13 receives a reproduction signal from the pickup unit 11, recovers the received reproduction signal into a desired signal value, or modulates a signal to be recorded into another signal recorded in the optical disc, such that it transmits the recovered or modulated result to the pickup unit 11. The servo unit 14 controls the pickup unit 11, such that it correctly reads a signal from the optical disc or correctly records a signal in the optical disc. The memory 15 stores a variety of data units including the control information. Also, the microprocessor 16 controls all constituent components contained in the recording/reproducing unit 50.

In association with the above-mentioned operations, a display 30 for displaying a signal reproduced by the recording/reproducing unit 50 may be employed, independently of the above-mentioned recording/reproducing device.

Unique disc type information, unique class information, and unique version information are programmed in the above-mentioned recording/reproducing device according to the present invention, such that the range of a disc having read/write compatibility in association with a corresponding recording/reproducing device can be recognized. For example, the above-mentioned information units are stored in the memory 15 in the form of a table structure 151 denoted by "Read/write compatibility table".

FIG. 7 shows an exemplary table. In more detail, according to the above-mentioned table 151, type information of a disc wherein data is recorded or reproduced by the recording/reproducing device includes "BDW", "BDR", and "BDO". Also, the type information includes a class number indicative of an available range of the write compatibility according to individual disc types, and a version number indicative of an available range of the read compatibility according to individual disc types.

For example, it can be recognized that the table 151 assigns a class number of 0 and a version number of 2 to a rewritable disc such as a BDW (Type="BDW") and a write-once disc such as a BDR (Type="BDR"). Also, it can be recognized that the table 151 assigns a class number of 0 and a version number of 0 to a BDO (Type="BDO").

A variety of discs can be seated or loaded in the recording/reproducing device including the above-mentioned table 151. For example, the optical disc "A" is a rewritable disc as dented by "Type="BDW", and is a disc in which a class number of 0 and a version number of 1 are recorded. The optical disc "B" is a write-once disc as denoted by "Type="BDR", and is a disc in which a class number of 1 and a version number of 3 are recorded. The optical disc "C" is a BDO as denoted by "Type="BDO", and is a disc in which a class number of 1 and a version number of 4 are recorded.

A method for determining the presence or absence of read/write compatibility of the recording/reproducing device in association with the above-mentioned discs, and a method for recording/reproducing data in/from a corresponding optical disc will hereinafter be described in detail. In association with the above-mentioned description, a method for determining the presence or absence of the read/write compatibility may be implemented by the microprocessor 16.

For example, if the optical disc "A" is seated in the recording/reproducing device, the recording/reproducing device can recognize that type information of the seated disc is a BDW, and compares a class number (Class 0) and a version number (Version 2) occupied by the recording/reproducing device in association with the BDW type with a class number (Class 0) and a version number (Version 0) recorded in the seated optical disc A.

In other words, the recording/reproducing device compares class numbers with each other, and determines the presence of read compatibility because the optical disc "A" has the same class number (Class 0) as that of the recording/reproducing device. The recording/reproducing device compares version numbers with each other, and determines the presence of write compatibility because a version number of 2 of the recording/reproducing device is higher than a version number of 0 of the optical disc "A". Therefore, the loaded optical disc A can record/reproduce data in/from a corresponding recording/reproducing device.

For example, if the optical disc "B" is seated or loaded in the recording/reproducing device, the recording/reproducing device can recognize that type information of the loaded disc is a BDR, and a class number (Class 0) and a version number (Version 2) of the recording/reproducing device in association with the BDR type are compared with a class number (Class 0) and a version number (Version 3) recorded in the loaded optical disc B.

In more detail, the recording/reproducing device firstly compares class numbers with each other, and determines the presence of read compatibility when the same class number (Class 0) as in the recording/reproducing device is provided. Thereafter, the recording/reproducing device compares version numbers with each other. If a version number (Version 2) of the recording/reproducing device is less than a version number (Version 3) of the optical disc "B", the recording/reproducing device determines the absence of write compatibility. The presence or absence of the final write-compatibility is determined on the basis of record speed information and record-associated information (WS) recorded in the DI of the optical disc "B". Therefore, data of the loaded optical disc "B" can be reproduced in a corresponding recording/reproducing device, but its recordable/unrecordable states are finally determined by reading DI recorded in the optical disc "B".

For example, if the optical disc "C" is seated or loaded in the recording/reproducing device, the recording/reproducing device can recognize that type information of the loaded disc is a "BDO", and a class number (Class 0) and a version number (Version 0) of the recording/reproducing device in association with the BDO are compared with a class number (Class 1) and a version number (Version 4) recorded in the loaded optical disc "C".

In other words, the recording/reproducing device firstly compares class numbers with each other. If a class number of the optical disc "C" is higher than that of a class number of the recording/reproducing device, the recording/reproducing device cannot access a data area capable of reproducing data of a corresponding disc, and determines the presence of a reproduction unavailable state by comparing class numbers with each other, and determines the presence of a record unavailable state without comparing version numbers with each other. Therefore, the above-mentioned recording/reproducing device cannot record data in the optical disc "C", and cannot reproduce the data of the optical disc "C".

As apparent from the above description, if recording/reproducing operations associated with a specific loaded disc are unavailable, it is preferable that the above-mentioned unavailability information be notified to a user. For example, if a display 30 is additionally contained in the recording/reproducing device, visual information messages such as an unavailable record state and unavailable reproduction state may be notified to the user via a screen of the display 30. Also, if the display 30 is not additionally contained in the recording/reproducing device, an audible message may be audibly notified to the user via a speaker.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for recording or reproducing data on or from a recording medium by an apparatus, comprising the steps of:
    reading, by the apparatus, control information including type information, a version number and a class number from a specific area of the recording medium loaded in a drive of the apparatus,
    wherein the type information is indicative of a type of the recording medium, the type being one of read-only recording medium, write-once recording medium or rewritable recording medium,
    wherein the version number and the class number are in a same byte position,
    wherein the class number specifies a read compatibility distinguished from the type information and is sequentially increased whenever physical attribute of the recording medium is changed to a predetermined range having no read compatibility, and
    wherein the version number specifies a write compatibility distinguished from the type information and the class number, and the version information is sequentially increased whenever physical attribute of the recording medium is changed to a predetermined range having no write compatibility;
    combining, by the apparatus, the type information, the class number and the version number to specify the type information, the class number within the specified type information, and the version number within the specified class number and type information; and
    determining, by the apparatus, the read compatibility and the write compatibility using the specified class number and the specified version number,
    wherein at least one of the class number and the version number of the apparatus is changed if a standard is changed.

2. The method according to claim 1, wherein the version number is sequentially increased within each different class number.

3. The method according to claim 2, wherein the version number is started from zero within each different class number.

4. The method according to claim 1, wherein the recording medium is specified using the type information at first, the class number within each type, and the version number within each class number.

5. The method according to claim 1, wherein the class number is determined according to each type of the recoding medium.

6. The method according to claim 1, wherein the version number and the class number are determined according to each type of the recording medium.

7. The method of according to claim 1, wherein the version number is sequentially increased if the physical attribute of the recording medium is changed to a predetermined range having no write compatibility, and increasing the class number is not needed.

8. The method according to claim 1, wherein the control information further includes disc size information of the recording medium, and the disc size information, the class number and the version number are allocated by 2 bits, 2 bits and 4 bits respectively in the same byte position of the management area.

9. A method for recording or reproducing data on or from a recording medium by an apparatus, comprising the steps of:
    a) reading, by the apparatus, type information, a class number and a version number from a specific area of recording medium loaded in a drive of the apparatus,
    wherein the type information is indicative of a type of the recording medium, the type being one of read-only recording medium, write-once recording medium or rewritable recording medium,
    wherein the class number and the version number are in a same byte position,
    wherein the class number for identifying a read compatibility is distinguished from the type information, and the version number for identifying a write compatibility is distinguished from the type information and the class number, and wherein at least one of the class number and the version number is changed if a standard is changed;

b) combining, by the apparatus, the type information, the class number and the version number to specify the type information, the class number within the specified type information, and the version number within the specified class number and type information;

c) determining, by the apparatus, whether the recording medium keeps the write compatibility and/or read compatibility with the drive on the basis of the specified class and version numbers; and d) controlling, by the apparatus, an access operation to record and/or reproduce data on or from the recording medium by the apparatus as a result of step c).

10. The method according to claim 9, wherein the version number is sequentially increased within each different class number.

11. The method according to claim 10, wherein the version number is started from zero within each different class number.

12. The method according to claim 9, wherein the recording medium is specified using the type information at first, the class number within each type, and the version number within each class number.

13. The method according to claim 9, wherein the step c) includes the steps of:
comparing the class number and the version number read from the recording medium with the class number and the version number specified in the drive, and determining the write compatibility and/or read compatibility according to the comparison result.

14. The method according to claim 13, wherein the step d) prohibits the access to the recording medium if the class number read from the recording medium is higher than the class number specified in the drive.

15. The method according to claim 14, wherein the prohibiting step prohibits the access for recording and reproducing to a data area of the recording medium.

16. The method according to claim 13, wherein the step d) prevents data from being recorded in the recording medium if the version number read from the recording medium is higher than the version number specified in the drive.

17. The method according to claim 16, wherein the step d) permits a reproducing of data in the recording medium even if the version number read from the recording medium is higher than the version number specified in the drive.

18. An apparatus for recording/reproducing data on/from a recording medium, the apparatus comprising:
a pickup unit configured to record or read data on or from the recording medium; and
a controller operatively coupled to the pickup unit, the controller configured
to control the pickup unit to read type information indicative of a type of the recording medium, a class number and a version number recorded in a specific area of the recording medium,
to combine the type information, the class number and the version number to specify the type information, the class number within the specified type information, and the version number within the specified class number and type information,
to determine whether the recording medium keeps the write compatibility and/or read compatibility with the drive on the basis of the specified class and the specified version number, the version number distinguished from the type information, the class number distinguished from the type information and the class number, and
to allow to reproduce data from the recording medium if it is determined that the recording medium keeps the read compatibility with the drive, and to allow to record data on the recording medium if it is determined that the recording medium kept the writing compatibility with the drive,
wherein the type is one of read-only recording medium, write-once recording medium or rewritable recording medium,
wherein the class number and the version number are in a same byte position, and
wherein at least one of the class number and the version number is changed if a standard is changed.

19. The apparatus according to claim 18, wherein the controller is configured to indentify whether the recoding medium is read-only recording medium, write-once recording medium or rewritable recording medium, based on the type information.

20. The apparatus according to claim 19, wherein the controller is configured to identify the recording medium using the type information at first, the class number within each type, and the version number within each class number.

21. The apparatus according to claim 18, further comprising:
a memory configured to store the class number and the version number of the drive.

22. The apparatus according to claim 18, wherein the controller is configured to determine whether the recording medium keeps the write compatibility and/or read compatibility with the drive by comparing the class number and the version number read from the recording medium with class number and version number specified in the drive.

23. The apparatus according to claim 22, wherein the controller is configured to control the access operation such that a recording and reproducing to the recording medium are prohibited if the class number read from the recording medium is higher than the class number specified in the drive.

24. The apparatus according to claim 22, wherein the controller is configured to control the access operation such that a recording of data in the recording medium is prohibited if the version number read from the recording medium is higher than the version number specified in the drive.

25. The apparatus according to claim 24, wherein the controller is configured to control the access operation such that a reproducing of data in the recording medium is permitted even if the version number read from the recording medium is higher than the version number specified in the drive.

26. An apparatus for recording/reproducing data on/from a recording medium, the apparatus comprising:
a pickup unit configured to record or read data on or from the recording medium; and
a controller operatively coupled to the pickup unit, the controller configured
to control the pickup unit to read control information including type information indicative of a type of the recording medium, a version number and a class number from a specific area of the recording medium, the class number for determining a read compatibility distinguished from the type information and the class number, and the version number being sequentially increased whenever a first physical attribute information of the recording medium is changed to a predetermined range having no read compatibility, to combine the type information, the class number and the version number to specify the type information, the class number within the specified type information, and the version number within the specified class number and type information, and to determined the read compatibility and the write compatibility using the specified class number and the specified version number, wherein the type is one of read-only recording medium, write-once recording medium or rewritable recording medium, wherein the version number and class number are in a same byte position, and wherein at least one of the class number and the version number is changed if a standard is changed.

27. The apparatus of claim 26, wherein the controller is configured to control the optical pickup to read or write data from or on the recording medium when reading or writing is allowable based on the determination of read compatibility or write compatibility.

28. The apparatus of claim 27, wherein
the controller is configured to specify the type information at first, the class number within each type, and the version number within each class number.

29. The apparatus according to claim 27, wherein the controller is configured to determine whether the recording medium keeps the write compatibility and/or read compatibility with the drive by comparing the class number and the version number read from the recording medium with class number and version number specified in the drive.

30. The apparatus of claim 27, further comprising a memory configured to store the control information including the class number and the version number of the drive.

31. The apparatus of claim 27, further comprising a host operatively coupled to the controller via an interface, the host configured to generate a read command or write command and to transmit the read command or write command to the controller via the interface.

* * * * *

UNITED STATES PATENT AND TRADEMARK OFFICE
CERTIFICATE OF CORRECTION

PATENT NO. : 8,085,636 B2  Page 1 of 1
APPLICATION NO. : 11/189767
DATED : December 27, 2011
INVENTOR(S) : Sang Woon Suh It is certified that error appears in the above-identified patent and that said Letters Patent is hereby corrected as shown below:

Title Page
At item (56), References Cited, under U.S. PATENT DOCUMENTS, at page 2, left-hand column, last line thereof, change:

"2009/0129494 A1  5/2009  Lee et al."

to

--2009/0129249 A1  5/2009  Lee et al.--.

Signed and Sealed this
Twenty-eighth Day of August, 2012

David J. Kappos
*Director of the United States Patent and Trademark Office*